(12) United States Patent
Honein et al.

(10) Patent No.: US 9,124,196 B1
(45) Date of Patent: Sep. 1, 2015

(54) DIAMAGNETIC LEVITATION TRAINING, THERAPY, GAME AND ENTERTAINMENT SPHERE

(71) Applicants: Philip Honein, Billerica, MA (US); Michael Lee Fraim, Rio Rancho, NM (US)

(72) Inventors: Philip Honein, Billerica, MA (US); Michael Lee Fraim, Rio Rancho, NM (US)

(*) Notice: Subject to any disclaimer, the term of this patent is extended or adjusted under 35 U.S.C. 154(b) by 0 days.

(21) Appl. No.: 14/726,303

(22) Filed: May 29, 2015

Related U.S. Application Data

(63) Continuation-in-part of application No. 14/495,788, filed on Sep. 24, 2014, now abandoned, and a continuation of application No. 14/153,050, filed on Jan. 12, 2014, now abandoned.

(51) Int. Cl.
*A63F 9/24* (2006.01)
*A63F 13/00* (2014.01)
*H02N 15/00* (2006.01)

(52) U.S. Cl.
CPC ............ *H02N 15/00* (2013.01); *A63F 2300/302* (2013.01)

(58) Field of Classification Search
CPC ......... H02N 15/00; A63F 13/25; A63F 13/28; A63F 2300/302; A63F 2300/8082; A63F 2250/02
See application file for complete search history.

(56) References Cited

U.S. PATENT DOCUMENTS

| | | | |
|---|---|---|---|
| 5,375,531 A | 12/1994 | Ogihara et al. | |
| 6,162,364 A | 12/2000 | Tillotson et al. | |
| 6,850,137 B2 | 2/2005 | Bird et al. | |
| 7,482,154 B2 | 1/2009 | DePaola et al. | |
| 7,597,002 B2 | 10/2009 | Moser et al. | |
| 7,827,993 B2 | 11/2010 | Cameron et al. | |
| 7,859,157 B2 | 12/2010 | Baur | |
| 8,169,114 B2 | 5/2012 | Simon | |
| 8,317,682 B2 | 11/2012 | Kawano et al. | |
| 8,360,999 B2 | 1/2013 | Leung et al. | |
| 2002/0147424 A1 | 10/2002 | Ostrow et al. | |
| 2003/0187320 A1 | 10/2003 | Freyman | |

(Continued)

FOREIGN PATENT DOCUMENTS

WO    WO 2006097785 A1    9/2006

OTHER PUBLICATIONS

Douglas et al (Journal of Physics Special Topics; "A2_3 Diamagnetic Levitation of a Human"; Douglas G.J.M, Marshall D.A., Griffiths I., Hands T.O.; Department of Physics and Astronomy, University of Leicester, Leicester, LE1 7RH; Nov. 8, 2011 (https://physics.le.ac.uk/journals/index.php/pst/article/view/430/301).

(Continued)

*Primary Examiner* — Steven J Hylinski
(74) *Attorney, Agent, or Firm* — Gerald M. Walsh; Leo Law Firm, LLC (57) ABSTRACT

A diamagnetic levitation sphere having concentric superconducting coils encircling a hollow sphere. The inner surface of the sphere is lined with a 3D visual display screen. Users in carbon fiber suits are positioned within the hollow sphere by entering the sphere at its bottom end, standing on an elevator platform, and then being elevated up towards the center of the sphere. The superconducting coils are energized, the users are levitated while on the elevator platform, and then the elevator platform is lowered to the bottom of the sphere, closing the sphere. The users then float freely in space and can participate in a full emersion space ride game. The diamagnetic levitation sphere can also provide users unique experiences in physical training, therapy, entertainment, and education.

17 Claims, 2 Drawing Sheets

(56) References Cited

U.S. PATENT DOCUMENTS

2006/0162452 A1  7/2006  Moser et al.
2009/0160279 A1  6/2009  Baur
2010/0036394 A1  2/2010  Mintz et al.

OTHER PUBLICATIONS

John Schenck, Med. Phys. 23(6), Jun. 1996, pp. 815-850, "The role of magnetic susceptibility in magnetic resonance imaging: MRI magnetic compatibility of the first and second kinds".

Geim, Andrey, "Everyone's Magnetism", Physics Today, September, pp. 36-39, 1998.

Berry, MV and Geim, AK, Of Flying Frogs and Levitrons, Eur. J. Physics, 18: 307-313, 1997.

Liu, Y, Zhu, D, Strayer, DM, and Israelsson, UE, Magnetic Levitation of Large Water Droplets and Mice, Advances in Space Research 45: 208-213, 2010.

Lee, GC, Goodwill, PW, Phuong, K, Inglis, BA. Scott, GC, Hargreaves, BA, Li, L, Chen, AC, Shah, RN, and Conolly, SM; Pyrolytic Graphite Foam: A Passive Magnetic Susceptibility Matching Material; J Magn Reson Imaging. Sep. 2010; 32(3): 684-691.

DIAMAGNETIC LEVITATION TRAINING, THERAPY, GAME AND ENTERTAINMENT SPHERE

The current application is a continuation in part of U.S. Nonprovisional patent application Ser. No. 14/495,788, filed Sep. 24, 2014, which is a continuation of U.S. Nonprovisional patent application Ser. No. 14/153,050, filed Jan. 12, 2014.

FIELD OF THE INVENTION

This invention relates to diamagnetic levitation devices and, more particularly, to a spherical enclosure positioned in the center of a diamagnetic levitation system so that users in the sphere can float freely in space and participate in video games associated with a spherical visual display on the inner surface of the sphere.

BACKGROUND OF THE INVENTION

A drawback of current electronic games and related entertainment is that they all have similar controller technology and use a flat screen technology for visual display. There is a strong market for entertainment having more advanced technological systems that provide new and more exciting forms of entertainment. Companies such as United Studios, Walt Disney World, and Six Flags continually work to create new games and entertainment experiences. Three dimensional (3D) amusement rides have become popular in amusement parks and 3D games are also popular since the introduction of 3D video displays.

U.S. Patent Application No. WO2009/011706 discloses a flexible emissive visual display screen that can display movies or still scenes. Because this screen is bendable it can be used to create an enhanced multi-dimensional audio-visual surround experience when positioned over multiple walls and/or ceilings so that the viewer feels immersed in the visual display. Because the screen is emissive it generates light rather than reflecting light. The screen can be manufactured as a continuous emissive display panel.

U.S. Pat. No. 7,224,382 discloses an immersive imaging system for the capture and display of high-resolution stereoscopic or monoscopic wide fields-of-view at still or video rates. Immersive imaging is defined as still or video images that provide a realistic or pseudo-realistic visual representation of an environment in such a way that the person viewing the images feels "immersed" in them (fully surrounded, as when immersed in water). With improvements in digital imaging components and processing speeds, there is increasing interest in immersive imaging because electronic and computer technologies can now support it. These immersive images are sometimes called wide-angle, panoramic, spherical or panospheric, based on the extent of viewing field that is shown.

U.S. Pat. No. 6,850,137 discloses a cost effective apparatus and method for levitating a diamagnetic material using a magnetic field produced by a superconducting magnet. The superconducting magnet includes a first superconducting coil having a central axis that produces a magnetic field when energized with current. A second superconducting coil is positioned concentrically within the first coil and has a central axis generally parallel to a central axis of the first coil. The second coil also produces a magnetic field when energized with current. A third superconducting coil is positioned concentrically within the second coil and has a central axis generally parallel to the central axes of the first and second coils. The third coil produces a magnetic field when energized with current and defines a bore of the magnet. The magnetic fields of the first, second and third coils combine to produce an operational magnetic field for levitating the diamagnetic material inside the bore.

U.S. Pat. No. 6,162,364 discloses a method and system for diamagnetic manipulation of an object in a surrounding medium in a low gravity environment. If the application requires directional manipulation of the object, at least one magnet or electromagnet is required. The object is repulsed by the magnet if the object is more strongly diamagnetic than the surrounding medium. If the object is less diamagnetic than the surrounding medium, however, then the object is effectively attracted to the magnet. For an application that requires suspension of the object, two oppositely polarized magnets are used to generate an appropriate magnetic field gradient to suspend the object in a location where opposing field vectors generated by the two magnets cancel each other out, producing a net field strength of zero.

U.S. Pat. No. 7,597,002 discloses a diamagnetic levitation system which combines the use of diamagnetic levitation and electrostatic actuators to create highly sensitive non-contact inertial sensing systems based on the magnetic levitation of a diamagnetic body. Several non-contact position sensors are placed on the diamagnetic body and on an array of magnets. The position information then can be used to maintain or move (by using non-contact electrostatic actuators) the diamagnetic object in the preferred direction.

Heretofore, it has not been possible to integrate the above technologies to convert a conventional 3D sitting or standing visual experience into a complete 3D visual experience using a spherical enclosure positioned in the center of a diamagnetic levitation system so that users in the sphere can float freely in space and participate in 3D video games associated with a spherical visual display on the inner surface of the sphere.

SUMMARY OF THE INVENTION

This invention provides a method of and apparatus for levitating one or more users in a hollow sphere diamagnetically. A magnetic field generating system is used having three concentric magnetic coils which define a central bore. At least two of the magnetic coils are super-conducting magnetic coils. When the magnetic coils are energized, they produce a magnetic field inside the bore. A hollow sphere is positioned within the bore. The sphere is formed of a spherical wall, the wall defining an interior of the sphere, and a visual display screen is attached to an interior surface of the wall. The visual display screen has a spherical or semi-spherical shape. Users are placed into carbon fiber suits, wherein the carbon fiber suits comprise 10% to 15% of the volume of the user. One or more users in carbon fiber suits can enter the interior of the sphere. Energizing the magnetic field generating system will produce the magnetic field inside the interior of the sphere, thereby levitating the users to a level depending upon the diamagnetic properties of the users and any materials attached to the users. A visual display on the screen is provided, wherein the visual display is visible to the users while the users are being levitated.

An opening and an elevator platform are provided at a bottom area of the sphere so that the users enter the sphere through the openings and position themselves on the elevator platform. The elevator platform with the users thereon is raised into the interior of the sphere. The magnetic field generating system is energized to increase the strength of the magnetic field, thereby levitating the users. The elevator platform is then lowered back to the bottom area of the sphere, whereby the users remain floating freely in the magnetic field within the interior of the sphere.

The three concentric coils are configured with an outer coil, a middle superconducting coil, and an inner superconducting coil. The middle superconducting coil and the inner superconducting coil concentrate the magnetic field of the outer coil, thereby increasing the strength of the magnetic field from 0.5 Tesla up to 30 Tesla in the direction of earth's gravity. The magnetic field is altered 1-4 Tesla perpendicular to earth's gravity to provide acceleration of side to side motion of the users. The locations of the users with respect to the wall and the visual display are detected.

Doppler effect of sound and image magnification changes are used to simulate an object coming into a field of view and coming out of a field of view. Air currents are directed towards the one or more users to create or enhance a feeling of movement or falling. Users are provided with the ability to control and interact with the visual display image on the visual display screen with verbal commands, hand gestures, eye movements, and/or sensors on the users. Users are also provided with the ability to manipulate the strength and orientation of the magnetic field with verbal commands, hand gestures, eye movements, and/or sensors on the users. The users can be vibrated by rapidly increasing and decreasing repeatedly the strength of the magnetic field. Aromas or scents can be injected into the interior of the sphere to represent odors suggested by the visual display. The ECG and/or EEG can be monitored in the users to detect onset of fear or panic and to modify the magnetic field as needed.

An advantage of the diamagnetic levitation sphere is that it creates a full emersion space ride game wherein a user can navigate in zero gravity through a virtual space sector, such as a solar system or world of his or her own choice, created by 3D video simulation on a spherical screen.

Another advantage is a game experience that can include the sensation of flying, swimming, and driving on a planet's surface.

Another advantage is that users can simply enjoy the feeling of weightlessness and floating in space, allowing users to rest, sleep, stretch, exercise, and experience physical and/or mental therapy in a diamagnetic levitation sphere that is 100 feet in diameter.

Another advantage is that the diamagnetic levitation sphere can be used to train military personnel, astronauts, pilots, and athletes.

Another advantage is that the diamagnetic levitation sphere can be used for educational purposes so that a student has the opportunity to explore specific planets, the solar system, and mapped portions of the universe, wherein the concepts of gravity, heavy element creation, and time relativity can be demonstrated to the student.

DETAILED DESCRIPTION OF THE INVENTION

While the following description details the preferred embodiments of the present invention, it is to be understood that the invention is not limited in its application to the details of construction and arrangement of the parts illustrated in the accompanying figures, since the invention is capable of other embodiments and of being practiced in various ways.

Based upon a publication by Douglas et al (Journal of Physics Special Topics; "A2_3 Diamagnetic Levitation of a Human"; Douglas G. J. M, Marshall D. A., Griffiths I., Hands T. O.; Department of Physics and Astronomy, University of Leicester, Leicester, LE1 7RH; Nov. 8, 2011 (https://physics.le.ac.uk/journals/index.php/pst/article/view/430/301), Douglas et al teach how to calculate the strength of a magnet in Tesla units (T) required to levitate an adult human by diamagnetic levitation. John Schenck ("The role of magnetic susceptibility in magnetic resonance imaging: MRI magnetic compatibility of the first and second kinds", Med. Phys. 23(6), June 1996, pages 815-850.) gives actual magnetic susceptibilities for water, lipids, bone and average human tissue of −9.05 ppm, −10.0 ppm, −12.8 ppm and −11 to −7 ppm respectfully. Douglas et al state that humans are composed of about 60% water and the balance of 40% is lipids and bone. The average density of the human body, Pave, is 1100 kg/m³, 10% greater than that of water. Based on those values, the magnetic force $F_B$ and gravitational force Fg must balance to levitate.

$$F_g = \rho_{ave} V_o g, \quad (1)$$

Above, equation (1) gives us the force exerted on a person due to Earth's gravity, where $V_o$ is the volume of the object and g is the approximate gravitational acceleration 9.81 m/s² on the Earth's surface.

The below expression, equation (2), gives the magnetic force as the product of the magnetization of the sample, M, and the gradient in the magnetic field, $\nabla B$, $$F_B = M \cdot \nabla B, \quad (2)$$

meaning equations (1) and (2) can be equated. By then substituting in for the magnetization, using equation (3), the volume term in equation (1) is canceled using the assumption that the volume of water, $V_{H2O}$, is 100% of the total volume, $V_O$; 1.1 factor accounts for fat and bone content;

$$M = \frac{\chi_D V_{H2O} B}{\mu_0} = 1.1 \frac{\chi_D V_o B}{\mu_0} \quad (3)$$

Douglas et al state that $X_D$, the diamagnetic susceptibility of water, is 9.035×10⁻⁶ m³/kg and $\mu_o$ is the permeability of free space (4π×10⁻⁷ H/m).

$$1.1 \frac{\chi_D V_o B}{\mu_0} \nabla B = \rho V_o g. \quad (4)$$

Concerning the force acting against gravity, $\nabla B$ is defined as equal to dB/dz where z is the vertical direction. Thus, rearranging equation (4) provides:

$$B \frac{dB}{dz} = 0.91 \frac{\rho_{ave} g \mu_0}{\chi_D}, \quad (5)$$

by comparison, the B dB/dz value of water is given as 1400 T²/m whereas using values for a human, 2501 T²/m for the human.

By then integrating over both dB and dz, a peak magnetic field strength is obtained:

$$\int B dB = 0.91 \frac{\rho_{ave} g \mu_0}{\chi D} \int dz, \quad (6)$$

$$B^2 = \frac{1.82 \cdot \rho_{ave} g \mu_0}{\chi D} z, \quad (7)$$

Then, by then substituting in the given values and a z value of 0.25 m (approximately the thickness of an adult male human or the height of the human lying down), we get that B is equal to 26.1 Tesla. Thus, a human can be diamagnetically levitated horizontally with a magnetic field strength of 26.1 Tesla (23-30 T). Magnets of this strength are feasible to build as disclosed in U.S. Pat. No. 7,609,139 and in US Publication No. 2008/0242551.

Based upon the publication by John Schenk the magnetic force is proportional to the magnetic field times the gradient times the magnetic susceptibility and the gravitation force is proportional to the density:

$F_{mag} = (\chi_{av} V/\mu_o) B \, dB/dh$ $F_g = \rho_{av} V g$

Where:

$\rho_{av} = (1-x)\rho_{human} + x\rho_{carbon}$ $\chi_{av} = (1-x)\chi_{human} + x\chi_{carbon}$ Setting Forces equal and solving for B:

$B \, dB = \rho_{av} g / (\chi_{av}/\mu_o) dh$

Solving:

$B = (\rho_{av} g / (\chi_{av}/\mu_o) h)^{0.5}$

Engineering values from Table V of the John Schenk publication for magnetic susceptibility for human and carbon graphite (−8.9 ppm and −204 ppm), density for human and carbon graphite (1040 and 2200 kg/m$^2$), and magnetic permeability of 1.25 ppm are used to calculate magnetic flux density (Tesla). Assuming the human is 1.8 m tall and 0.3 m thick, a carbon fiber space suit constructed with 10% volume of the human inside, B equals 12.2 T for human oriented perpendicular to gravity (laying down) and B equals 30 T for human parallel to gravity force (standing up). The most stable position is perpendicular to gravitational force as the magnetic force balances the gravitational force. The human will not be able to tell "up" from the force of gravity so "lying down" is ok for the game. For space simulations requiring the human to be parallel to gravitation force, then a space suit with 15% carbon fiber volume ratio can be used to reduce B to 26.5 T. Magnets of this strength are feasible to build as disclosed in U.S. Pat. No. 7,609,139 and in US Publication No. 2008/0242551.

Figure 1:
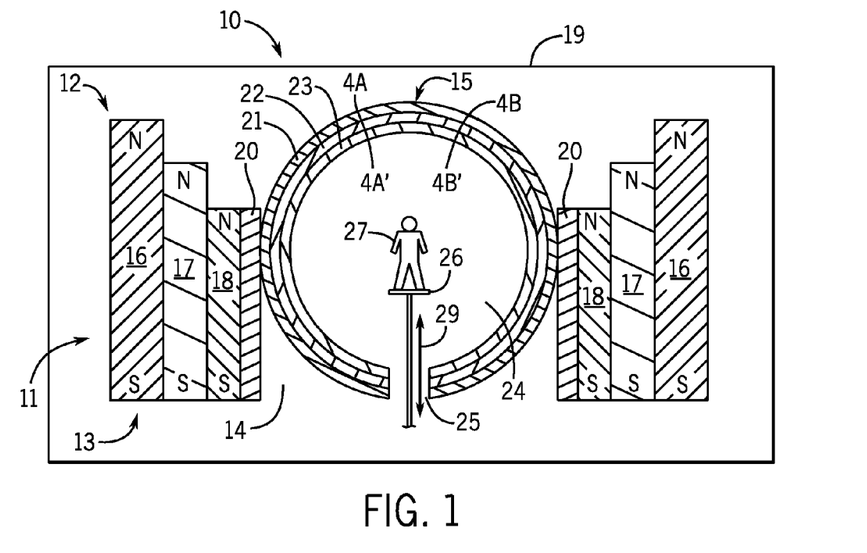
FIG. 1 shows a side sectional view of the diamagnetic levitation entertainment sphere of the present invention.

FIG. 1 shows a cross sectional side view illustration of the diamagnetic levitation entertainment sphere 10. The diamagnetic levitation entertainment sphere 10 has a magnetic field generating system 11 which is constructed of three concentric cylindrical coils 16, 17, and 18. Coils 16 may be a conventional coil or, preferably, a superconductive coil. Coils 17 and 18 are, preferably, superconductive coils. The diamagnetic levitation entertainment sphere 10 has a top area 12 and a bottom area 13. The superconductive coils 16, 17, and 18 are shown polarized as North (N) at the top area 12 and South (S) at the bottom area 13. The first superconductive coil 16 is the outermost coil (outer coil). The second superconductive coil 17 (middle coil) is positioned within the first coil 16 and is concentrically adjacent to the first coil 16. The third superconductive coil 18 (inner coil) is positioned within the second coil 17 and is concentrically adjacent to the second coil 17. Coils 16, 17, and 18 each produce a magnetic field when energized with electric current by methods known in the art. The magnetic fields of the coils 16, 17, and 18 combine to produce an operational magnetic field inside bore 14 of the magnetic field generating system 11 for levitating diamagnetic materials, including living human bodies. Since the magnets are superconducting magnets and since magnet strength does not need to exceed 30 T, power requirements for the magnets are substantially less compared to conventional magnets.

The magnets are constructed to provide up to 30 Tesla field strength by methods known in the art. The magnets may then be operated in a persistent mode. Once the magnets have been energized, a short-circuit is created in the windings with a piece of superconductor. The windings become a closed superconducting loop, the power supply can be turned off, and persistent currents will flow for months, preserving the magnetic field. The advantage of this persistent mode is that stability of the magnetic field is better than is achievable with the best power supplies, and no energy is needed to power the windings. The short circuit is made by a 'persistent switch', a piece of superconductor inside the magnet connected across the winding ends, attached to a small heater. In normal mode, the switch wire is heated above its transition temperature, so it is resistive. Since the winding itself has no resistance, no current flows through the switch wire. To go to persistent mode, the current is adjusted until the desired magnetic field is obtained, then the heater is turned off. The persistent switch cools to its superconducting temperature, short circuiting the windings. The current and the magnetic field will not actually persist forever, but will decay slowly according to a normal L/R time constant:

$H = H_0 e^{-(R/L)t}$ where R is a small residual resistance in the superconducting windings due to joints or a phenomenon called flux motion resistance. Nearly all commercial superconducting magnets are equipped with persistent switches.

Positioned within bore 14 is the entertainment sphere 15 having a hollow interior 24 fastened to a frame. The frame also sets in the bore 14. The frame is made of fiberglass to prevent lift and fasteners are made of non-magnetic stainless steel. All displays are of military specification for up to 30 T magnetic pulse damage rating. Magnetic shielding 19 may surround the diamagnetic levitation entertainment sphere 10. The magnetic shielding 19 prevents the diamagnetic field from affecting metal or magnetic objects external to the shielding 19, such as credit cards, computers, cell phones, medical devices, and the like. The shielding 19, preferably, is made of nickel/iron alloy or silica/iron alloy. Insulation 20 is used on the innermost coil 18 to provide thermo separation for human bodies (users) 27 from cryogenic fluid used with the superconducting coils 16, 17, and 18. The entertainment sphere 15 is constructed of a wall 21, which defines the interior 24 of the entertainment sphere 15. The wall 21 is made of non-magnetic material. A visual display screen 22 is attached to the interior surface of the wall 21. The screen 22 is, thus, spherical or semi-spherical. Preferably, the screen 22 is constructed of 6-40 spherical segments for back projection or emissive display and each segment's light emission is isolated from other segments so there will be a visible dark seam between segments. The display can be video or still scenes and the projection is multiple 2D or integrated 3D segments. Preferably, a non-glare layer or cover 23 is placed on the interior aspect of the flexible light emitting diode screen 22 to prevent damage from occurring. Chemical vapor or silica carbide coating is useful to prevent scratching but will not prevent ripping or tearing. The spherical screen 22 enhances the visual experience of free floating in space. The spherical display may be supported by a frame which sets in the bore 14 of the magnetic field generating system 11. The frame is, preferably, made of fiberglass to prevent lift and the fasteners for the frame and entertainment sphere 15 are made of non-magnetic stainless steel.

A nonmetallic or nonferrous elevator platform 26 and users 27 enter the sphere 15 through an opening 25 at the bottom area 13 of sphere 15. A user 27 is placed on the elevator platform 26 at the bottom area 13 and is raised into the interior 24 of the sphere 15. The magnetic field of the magnetic field generating system 11 is then increased in strength to levitate the user 27. The elevator platform 26 is then lowered to the bottom 13 of the sphere 15, thereby closing the sphere 15, and the user 27 remains floating freely in the interior 24 of sphere 15 in net zero gravity. The raising and the lowering of the elevator platform 26 are indicated by arrows 29.

The superconductive coils are from 5 feet to 20 feet in height, preferably 12 feet height. The diameter of the sphere 15 is from 8 to 20 feet in length, preferably 12 feet. The bore 14 has a diameter sufficient to accommodate sphere 15.

Figure 2:
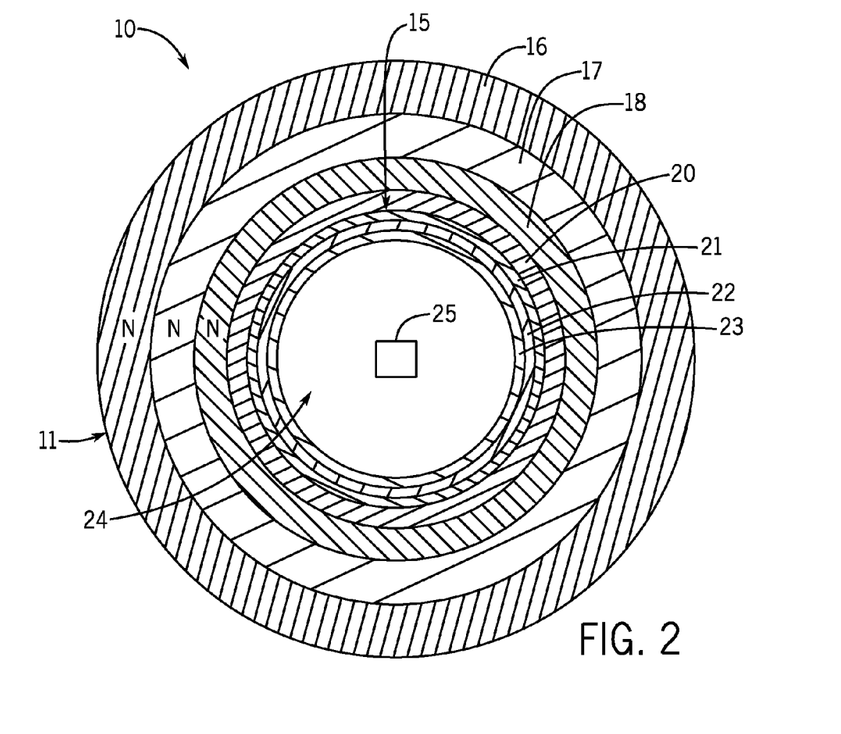
FIG. 2 illustrates a top view diagram of the magnetic field generating system.

FIG. 2 illustrates a top view of the magnetic field generating system 11, further illustrating the positions of the cylindrical superconductive coils 16, 17, and 18, the entertainment sphere 15, and the elevator entrance 25.

Figure 3:
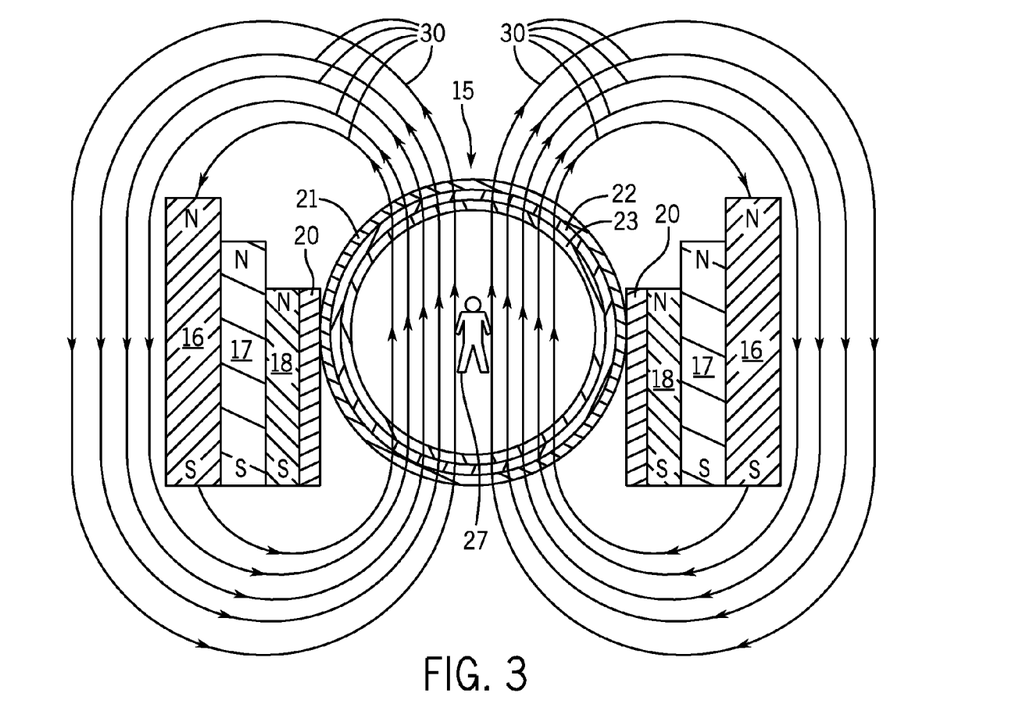
FIG. 3 shows the orientation of the magnetic field lines created by the superconductive coils.

FIG. 3 provides a side view illustration of magnetic field lines 30. Each coil's magnetic field is additive. The two inner superconducting coils 17 and 18 concentrate the magnetic field of the outer coil 16. The interior coils compress the magnetic field lines 30, thus increasing the field strength of the outer coil 16 from 0.5 Tesla to 30 Tesla in the direction of earth's gravity. The magnetic field can also be altered 1-4 Tesla perpendicular to the earth's gravity to produce acceleration of side to side motion of the user 27 by using additional conventional magnets (not shown) interacting with the magnetic field generating system 11.

Figure 4:
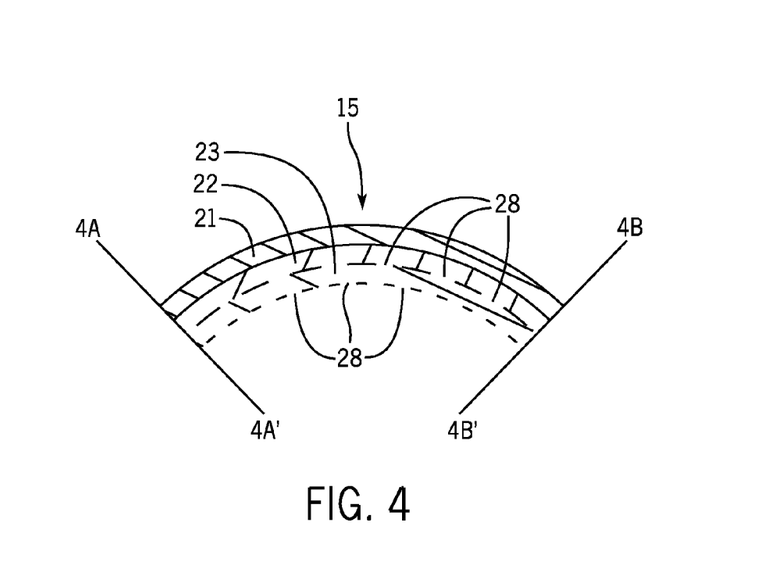
FIG. 4 shows an expanded portion of the sectional view of the entertainment sphere.

FIG. 4 illustrates an expanded portion of the sectional view of the entertainment sphere 15 along lines 4A-4A' to 4B-4B'. FIG. 4 further illustrates the wall 21 of the sphere 15, the screen 22 attached to the interior aspect of the wall 21, and the protective coating on the interior aspect of the screen 22. Both the screen 22 and the protective cover 23 have openings 28 to allow the flow of air and sound through.

The present invention uses a strong magnetic field for diamagnetic levitation of one or more human bodies wearing carbon fiber suits in the entertainment sphere. The suit is constructed of woven pyrophoric graphite (carbon) fiber and cotton fiber coated with Teflon®. The volume of the suit is 10% to 15% of the volume of the user. For example, if the body of the user comprises 70 liters of volume the suit would comprise 7 to 10.5 liters. Teflon® prevents conduction of electricity to the human body. Total volume of carbon fiber in the space suit is adjusted to provide a magnetic lifting force slightly above gravitational force. Each user may have a pyrophoric carbon mat added to the user's suit so that each user can have a different diamagnetic property compared to other users. In this way each user will float at a designated level in the entertainment sphere. The height the human in the sphere is auto leveling and is set by the carbon fiber content in the suit. The suit is designed to turn the human perpendicular to the gravitational force. Since the pyrophoric graphite is very conductive, it will focus the magnetic field in the space suit. The suit will protect the user against the cryogenic temperatures near the magnetic surface.

One use of the invention is to create a full emersion space ride game using a spherical, or semi-spherical, curved visual display screen on the interior wall of the sphere. The user (player) navigates in zero or micro gravity through an artificial space sector, such as a solar system or world of his or her choice, created by 3D video simulation on the curved screen. By controlling the sensation of gravity, the spherical screen display and magnetic levitation will give the game participant the true feeling of flying, acceleration, and space travel. The arrangement of the magnets surrounding the chamber is powerful enough to create a sharp change in the magnetic field, allowing diamagnetic objects such as human bodies, carbon fiber or wood to float freely inside of the sphere. Sensors can be used to detect the location of the player with respect to the sphere's walls and screen. This 3D location can be determined with fiber optic laser and/or ultrasonic distance measurements. The compressed magnetic field in the bore of the magnetic coils is used to center the participant in the chamber. Additional electrical control magnetic coils can be used to orient the person in the sphere with respect to the image on the spherical screen. The sphere has an acoustic speaker system which is, preferably, full 6 channel surround sound wherein the user can hear sound at all frequencies from the top, bottom, North, South, East and West. Each screen segment may have its own speaker system. Both Doppler Effect of sound and image magnification changes can be used to simulate an object coming into the field of view and coming out of the field of view. Creating the Doppler Effect with the directional sound systems and increasing and decreasing visual image size enhance the brain's perception of moving away or towards an image in any direction in the sphere. Air currents can be directed towards the user to create or enhance the feeling of movement or falling. The feeling of rotation is accomplished by rotation of the view by display control. Controlling perception in zero gravity can give the illusion of falling, rising, turning, or travelling by changing the image's magnification and orientation with time.

User interaction with the visual image on the screen is controlled by the user with verbal commands as well as with sensors in the carbon fiber suit that the user is wearing. Game experience includes the sensation of flying, sitting, swimming, and driving on a planet's surface. Vibrating the human body can be accomplished by rapidly increasing and decreasing repeatedly the strength of the magnetic field. In case of explosion simulation, the user can be pushed from and then pulled back to the center of sphere. Environmental temperature in the interior of the sphere can be controlled by forced air heating and cooling through air ventilation originating at the bottom or sides of the superconducting magnet coil bore and exiting from the top of the sphere. To enhance visual experience and scene change, aromas or scents can be injected into the interior of the sphere to represent the odors suggested by the visual display.

To enter the sphere, the user removes any sort of ferrous metal, jewelry, or clothing and passes through a metal detector for final inspection. Having any ferrous metal on the user may cause harm to the user and/or to the spherical screen as metal objects are strongly attracted to the superconducting magnet. Upon entering the bottom of the sphere, the user stands on the plastic elevator platform and is raised into the interior of sphere. The intensity of the magnetic field is then slowly increased to produce levitation. Meanwhile, the heart rate (ECG) and/or brain activity (EEG) of the user may be monitored to detect the onset of fear or panic. As the user experiences zero gravity the elevator platform is lowered to start the game. The back lights of the curved screen are dimmed and the video game image is displayed. The user will experience a feeling of "no bottom", just as if floating in outer space. The heart rate, position, and perceived acceleration of the user in the sphere is monitored by the suit.

Example 1

Mission Option

One or two pilots can be loaded into a pilot chair complete with a "joy stick" flight controller and a "heads up" weapons controller in the helmet. The player is taken to a planet or solar system and the objectives of the mission might be, for example, to kill as many aliens as possible or make a supply run through an asteroid field in a given amount of time. Suns, lasers and explosions may be simulated in 3D video with the flexible light emitting display screen generating the desired brightness level. The back projected display may show planets, asteroids, gas clouds, and other objects with a contrasting brightness level. To get the feeling of walking and being thrown back by an explosion or making a tight turn in space, the magnetic field is controlled to add extra resistance, to accelerate the player a certain distance backwards and then pull the participant back to the center of sphere. Data from the position sensors on the user's suit and the global position sensors on the sphere are processed by a computer to control the magnetic field for producing the desired effects on the user. If the user decides to move in space, then the magnetic field will alter the user's body position and allow the user to feel the resistance from the air current along the user's arms and legs in response to signals from the user.

Example 2

Exploration Option

For exploration of a planet or solar system, the user commands can be given with voice or hand gestures while observing the view on the screen. The player will have the ability to control image movement on the screen with hand jesters, voice control, and eye movement with 'heads up' display in the helmet. Hand jesters can be used, for example, for steering a simulated space craft, voice control for scenario control and emergency shutdown, and eye movement for targeting simulated weapons or movement of crane arm for satellite pick up. Voice can be detected with microphones in the sphere while hand jesters can be detected with sensors in the suit or with infrared cameras in the sphere, regardless of the orientation of the user. The voice or hand commands are, preferably, processed by a navigation computer, based upon the voice or hand signals. The computer will be able to read hand jesters by mapping hand movements of the participant with near infrared light. By mapping whole body movements with near infrared light, the orientation of the participant can be determined with relation to the image projected on the spherical screen. The navigation computer will automatically change the magnification of the video display (zoom in or zoom out) and change orientation of the user with respect to the display on the screen. The centrifugal force of turning a space craft or personal propulsion device is simulated by a movement created by outer magnet 16 wherein the user experiences a force pushing opposite of the direction of a turn and then slowly pulling the user back to the center of the spherical screen. The base of outer magnet 16 can be moved up and down 30° to do the required side pushing. When in the sphere, the user will feel like he or she is part of the scene in the 3D video display, such as if flying through an asteroid field or glowing gas cloud. The user will experience full high definition 3D images of video displayed objects which appear to be moving towards and way from the user.

Voice or hand commands can be used to shut down the game. When the game is over the player is reoriented to stand on the elevator platform. The user's weight is slowly increased to earth's gravitational force. After a few seconds of full gravity, the player is lowered by the elevator platform to the bottom of the sphere for exiting.

The diamagnetic levitation sphere may be used, alternatively, for users to enjoy the feeling of weightlessness and floating in space. In this use, the superconductive coils are 100 to 200 feet in height, preferably 150 feet in height. The entertainment sphere is 50 to 100 feet in height. The bore has a diameter sufficient to accommodate the sphere. The visual display from the screen is controlled by someone other than the user. Each user will float at a designated level in the entertainment sphere. The diamagnetic levitation entertainment sphere is otherwise similar to that describe above. However, it is preferred to use still scenes with the visual display for the flotation experience rather than with video, for example, using still scenes such as those of the constellations, the Milky Way galaxy, the solar system, various individual planets, and the like. The diamagnetic levitation entertainment sphere 10 allows users to rest, sleep, stretch, exercise, and experience physical and/or mental therapy.

The diamagnetic levitation sphere may have non-entertainment uses such as for military purposes, astronaut and space pilot training, athletic training, education, and therapy. Astronauts currently practice in water pools to giving them the opportunity of feeling suspended but still have the sensation of gravity and of friction produced by movement through water. With the diamagnetic levitation sphere, the sensation of weightlessness without friction would be much more realistic than the experience in a water pool. A helmet can contain the 'heads up' display that would detect eye movement for visual command of weapon simulation. The helmet can also use an electroencephalogram (EEG) mapping of brain electrical activity to control simulations for astronaut or military training or missions in space. The helmet may also record voice commands and operate 3D sound projection from the top, bottom, and curved sides of the sphere. A simulation could show a crane arm for satellite pick up and zooming in and zooming out could create the sensation of moving towards or away from an object. For educational purposes, a student has the opportunity to explore specific planets, the solar system and mapped portions of the universe. The concepts of gravity, heavy element creation, and time relativity can be demonstrated to the student. Pictures of other solar systems, single star and twin star creation, planet creation, black hole creation, and comet creation can be shown in current still image and/or in accelerated time simulation video 3D simulation. A student may zoom in and out and change orientation of view of 3D images.

The foregoing description has been limited to specific embodiments of this invention. It will be apparent, however, that variations and modifications may be made by those skilled in the art to the disclosed embodiments of the invention, with the attainment of some or all of its advantages and without departing from the spirit and scope of the present invention. For example, Carbon fiber composition can be used to levitate objects such as a pilot's chair, stimulated satellite or space craft parts. Methods of the present invention can include users throwing objects back and forth, such as balls or spinning objects such as Frisbees™. Users can strike objects back and forth, such as tennis balls or badminton shuttlecocks. Users can play athletic games such as soccer and volleyball. Any kind of audio and/or visual entertainment can be provided. The inner surface of the walls can have shock absorbing material such as plastic foam to inhibit injuries if a user makes contact with the wall.

It will be understood that various changes in the details, materials, and arrangements of the parts which have been described and illustrated above in order to explain the nature of this invention may be made by those skilled in the art without departing from the principle and scope of the invention as recited in the following claims.

We claim:

1. A method of levitating one or more users in a hollow sphere diamagnetically, comprising the steps of:
   1) providing a magnetic field generating system having three concentric magnetic coils defining a central bore, wherein at least two of said magnetic coils are superconducting magnetic coils and wherein, when said magnetic coils are energized, they produce a magnetic field inside said bore;
   2) placing said hollow sphere within said bore, said sphere being formed of a spherical wall, said wall defining an interior of said sphere, and a visual display screen attached to an interior surface of said wall, said visual display screen having a spherical or semi-spherical shape;
   3) placing users into carbon fiber suits, wherein the carbon fiber suits comprise 10% to 15% of the volume of the user;
   4) placing one or more said users in said carbon fiber suits inside said interior of said sphere and energizing said magnetic field generating system thereby producing said magnetic field inside said interior of said sphere;
   5) levitating said one or more users to a level depending upon the diamagnetic properties of said one or more users and any materials attached to said one or more users; and
   6) providing a visual display on said screen wherein said visual display is visible to one or more said users while said one or more users are being levitated.

2. The method of claim 1, further comprising:
   1) providing an opening and an elevator platform at a bottom area of said sphere so that said one or more users enter said sphere through said opening and position themselves on said elevator platform;
   2) raising said elevator platform with said one or more users thereon into said interior of said sphere;
   3) energizing said magnetic field generating system to increase the strength of said magnetic field thereby levitating said one or more users; and
   4) lowering said elevator platform to said bottom area of said sphere, whereby said users remain floating freely in said magnetic field within said interior of said sphere.

3. The method of claim 2 wherein said three concentric coils are configured with an outer coil, a middle superconducting coil, and an inner superconducting coil, said middle superconducting coil and said inner superconducting coil concentrating the magnetic field of 30 Tesla in the direction of earth's gravity.

4. The method of claim 3, further comprising the step of altering said magnetic field 1-4 Tesla perpendicular to earth's gravity to provide acceleration of side to side motion of said one or more users.

5. The method of claim 4, further comprising detecting the locations of said one or more users with respect to said wall and said visual display.

6. The method of claim 5, further comprising using Doppler effect of sound, image magnification, and view orientation changes to simulate an object coming into field of view, coming out of field of view, and turning.

7. The method of claim 6, further comprising directing air currents towards said one or more users to create or enhance a feeling of movement or falling.

8. The method of claim 7, further comprising providing said one or more users the ability to control and interact with said visual display image on said visual display screen with verbal commands, hand gestures, eye movements, and/or sensors on said one or more users.

9. The method of claim 8, further comprising providing said one or more users the ability to manipulate the strength and orientation of said magnetic field with verbal commands, hand gestures, eye movements, and/or sensors on said one or more users.

10. The method of claim 9, further comprising vibrating said one or more users by rapidly increasing and decreasing repeatedly the strength of said magnetic field.

11. The method of claim 10, further comprising injecting aromas or scents into said interior of said sphere to represent odors suggested by said visual display.

12. The method of claim 11, further comprising monitoring ECG and/or EEG in said one or more users to detect onset of fear or panic.

13. A method of levitating one or more users in a hollow sphere diamagnetically, comprising the steps of:
   1) providing a magnetic field generating system having three concentric magnetic coils defining a central bore, wherein at least two of said magnetic coils are superconducting magnetic coils, wherein, when said magnetic coils are energized, they produce a magnetic field inside said bore, and wherein said three concentric coils are configured with an outer coil, a middle superconducting coil, and an inner superconducting coil, said middle superconducting coil and said inner superconducting coil concentrating said magnetic field of said outer coil, thereby increasing the strength of said magnetic field from 0.5 Tesla up to 30 Tesla in the direction of earth's gravity;
   2) placing said hollow sphere within said bore, said sphere being formed of a spherical wall, said wall defining an interior of said sphere, and a visual display screen attached to an interior surface of said wall, said visual display screen having a spherical or semi-spherical shape;
   3) placing users into carbon fiber suits, wherein the carbon fiber suits comprise 10% to 15% of the volume of the user;
   4) placing one or more said users in said carbon fiber suits inside said interior of said sphere and energizing said magnetic field generating system thereby producing said magnetic field inside said interior of said sphere;
   5) levitating said one or more users to a level depending upon the diamagnetic properties of said one or more users and any materials attached to said one or more users;
   6) providing a visual display on said screen wherein said visual display is visible to said one or more users while said one or more users are being levitated;
   7) altering said magnetic field 1-4 Tesla perpendicular to earth's gravity to provide acceleration of side to side motion of said one or more users;

8) providing said one or more users the ability to control and interact with said visual display image on said visual display screen with verbal commands, hand gestures, eye movements, and/or sensors on said one or more users; and 9) providing said one or more users the ability to manipulate the strength and orientation of said magnetic field with verbal commands, hand gestures, eye movements, and/or sensors on said one or more users.

14. An apparatus for levitating one or more users in a sphere diamagnetically, comprising:
   a) a magnetic field generating system having three concentric magnetic coils defining a central bore, wherein at least two of said magnetic coils are superconducting magnetic coils and wherein, when said magnetic coils are energized, they produce a magnetic field inside said bore;
   b) a hollow sphere within said bore, said sphere being formed of a spherical wall, said wall defining an interior of said sphere, and a visual display screen attached to an interior surface of said wall, said visual display screen having a spherical or semi-spherical shape;
   c) said three concentric coils being configured with an outer coil, a middle superconducting coil, and an inner superconducting coil, said middle superconducting coil and said inner superconducting coil concentrating the magnetic field of said outer coil, thereby increasing the strength of said magnetic field from 0.5 Tesla up to 30 Tesla in the direction of earth's gravity; and
   d) conventional magnets interacting with said magnetic field generating system to alter said magnetic field 1-4 Tesla perpendicular to the earth's gravity for producing acceleration of side to side motion of said one or more users in said interior of said sphere.

15. The apparatus of claim 14, further comprising an opening and an elevator platform at a bottom area of said sphere, wherein said elevator platform is constructed so that when said one or more users enter said sphere through said openings they are able to position themselves on said elevator platform.

16. The apparatus of claim 15, further comprising insulation on said inner super conducting coil, wherein said insulation is constructed to shield said one or more users from cryogenic fluid used with said superconducting magnetic coils.

17. The apparatus of claim 16, further comprising magnetic shielding surrounding said magnetic field generating system.

* * * * *